H. CARPENTER.
REWINDER FOR MOTION PICTURE FILMS.
APPLICATION FILED JULY 11, 1917.
1,270,115.
Patented June 18, 1918.
2 SHEETS—SHEET 1.
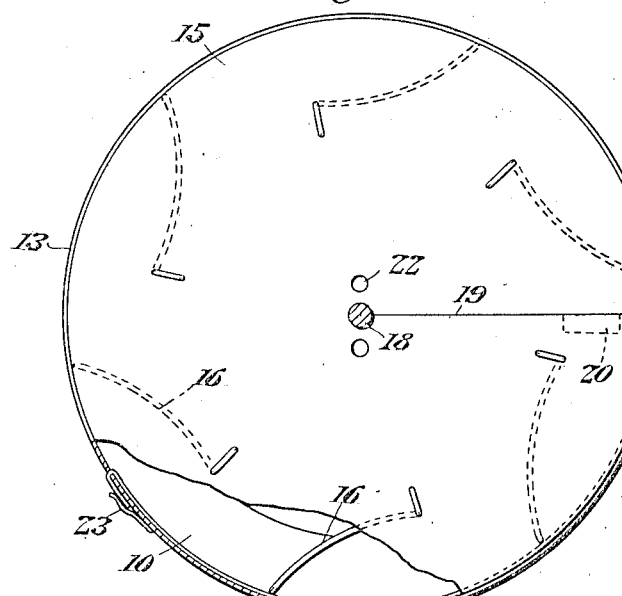
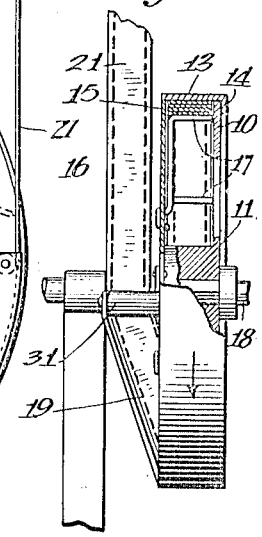
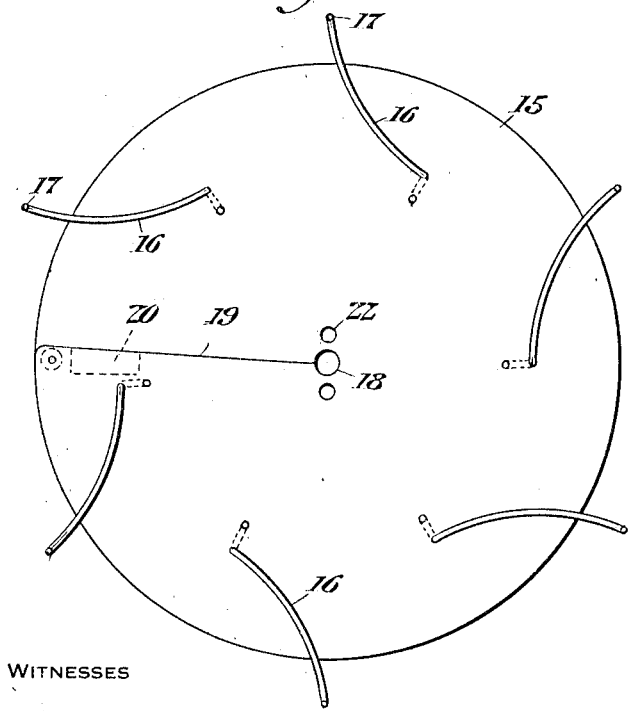
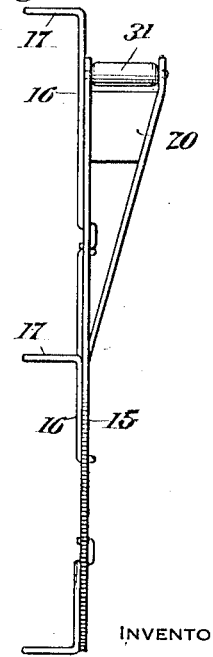
WITNESSES
INVENTOR
H. Carpenter
BY Victor J. Evans
ATTORNEY

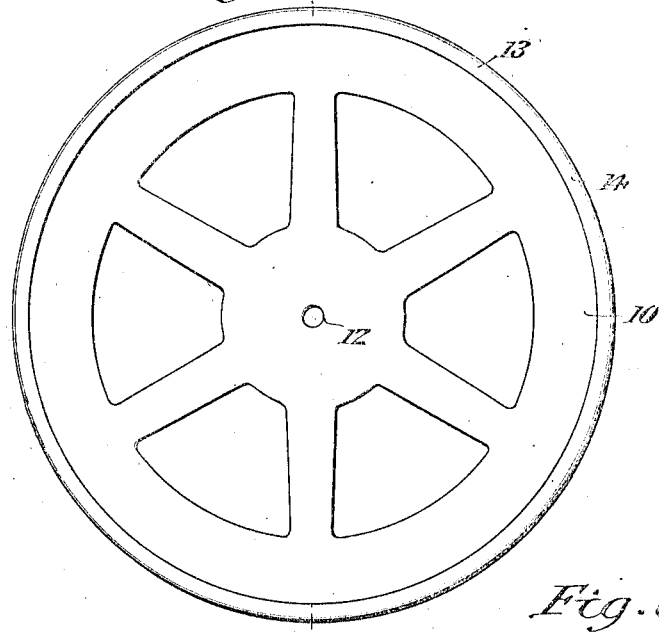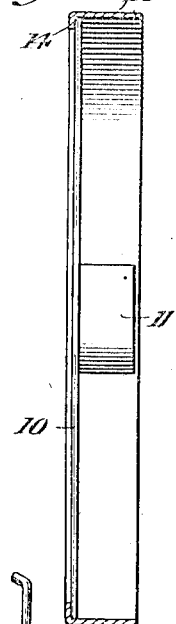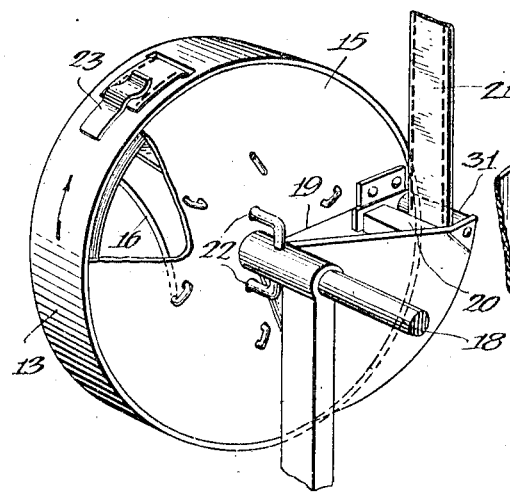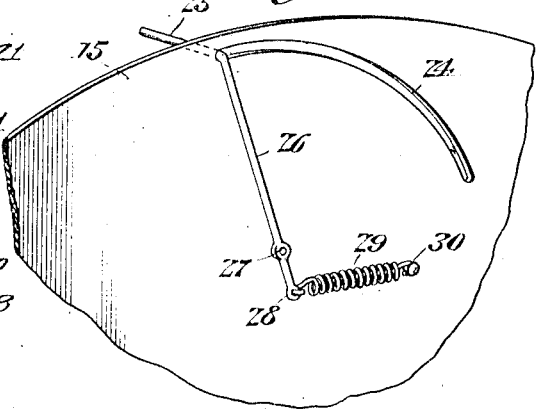

UNITED STATES PATENT OFFICE.

HEZEKIAH CARPENTER, OF HAXTUM, COLORADO.

REWINDER FOR MOTION-PICTURE FILMS.

1,270,115.  Specification of Letters Patent.  Patented June 18, 1918.

Application filed July 11, 1917. Serial No. 179,950.

*To all whom it may concern:*

Be it known that I, HEZEKIAH CARPENTER, a citizen of the United States, residing at Haxtum, in the county of Phillips and State of Colorado, have invented new and useful Improvements in Rewinders for Motion-Picture Films, of which the following is a specification.

This invention is a rewinder for a motion picture film which has been projected or shown and it is desired to project or show the film again.

One object of the invention is to provide a takeup reel that will also act as a rewinder to automatically rewind the film so that the independent positives thereon will be shown in their proper sequence and order.

A further object is to provide a stationary side plate with a guide and spring elements to coöperate with the regular reel to wind the film from the outside so that the film will be laid up in successive layers and convolutions in regular order, and to maintain proper tension upon the layers or convolutions during the rewinding.

A still further object is to provide a shroud with a flange adapted to engage and encircle a regular film reel, and a side plate having spring fingers and a guide to coöperate with the reel and the shroud and form temporarily a unitary structure, which will permit the reel to rotate.

The invention, broadly stated, comprises a film reel of the usual type and construction, a shroud therefor having a flange, a side plate having spring fingers arranged adjacent the periphery and acting outwardly toward the shroud, a guide slot formed in the side plate adapted to fit the film between the fingers and the shroud, and means to rotate the reel.

One practical form of the invention will be described and illustrated in the accompanying drawings, in which:—

Figure 1 is a side elevation of the rewinder with a film partly rewound;

Fig. 2 is a side elevation of a detachable side plate showing the guide and spring fingers;

Fig. 3 is an edge elevation of the side plate;

Fig. 4 is a side elevation of the shroud for the regular reel;

Fig. 5 is a sectional view on the line 5—5 of Fig. 4;

Fig. 6 is an enlarged view of one of the spring fingers; and

Fig. 7 is a detail view of a modification, showing another method of making and connecting the spring fingers.

Fig. 8 is a perspective view.

Fig. 9 is a view partly in elevation and partly in vertical section.

In the preferred embodiment shown, the regular reel provided with the side plate 10, and hub 11, which hub is provided with a hole 12 through which may be passed a suitable spindle, is employed. Adapted to engage with the periphery of the side plate 10 is a shroud 13, which is provided with a flange 14. The flange 14 serves to engage with the side of the side plate 10, while the shroud engages with the periphery or the circumference of the plate 10. The film reel is adapted to rotate in the usual or customary manner.

To coöperate with the reel and shroud is a side plate 15, which is provided with a series of spring fingers. These spring fingers are spaced radially around the plate, and are secured to the plate in any usual or customary manner. The spring fingers are formed to have a curved or bent portion 16 terminating in a free end 17 which is angularly disposed to the curved portion 16. These spring fingers are so positioned that they will exert pressure outwardly toward the shroud 13, and the end 17 is so formed that it lies in a plane parallel to the shroud. As these spring fingers are provided with one point of attachment the free ends are adapted to rotate or move about this point.

The side plate 15 is provided with a central aperture 18, and is further provided with a guide which as shown is formed by cutting the plate in a radial manner, as indicated by the slit 19, and adjacent the periphery of the disk the spacing block 20 is interposed so as to separate the slit 19. The block 20 should be of such width as will conform to the size of the film to be rewound.

Thus the block will act as a guide and tend to direct the film indicated at 21 to the inner side of the shroud 13. The spring fingers tend to press outwardly, and the end 17 will operate to lay the film up in successive layers or convolutions from the shroud 13 to the barrel 11.

The film will be thus disposed within the shroud and on the reel in such a manner that the wall end of the film will lie against the shroud so that the film may be unwound in its proper order or sequence.

The side plate 15 may be formed of any suitable material, but it is preferred to make it of metal, and as shown is preferably circular in outline. Adjacent the central opening 18 are holes 22 which may serve to co-operate with holding means that will prevent the side plate 15 from rotating, as it is desired to maintain this plate in a stationary position.

The shroud 13 is provided with a film end holding element, indicated at 23, which will prevent the film from moving while being rewound upon the film reel. It is desired to make the several parts detachable and of suitable material that will conform to the underwriter's code.

The spring fingers have been shown as being of solid construction or formed of a single piece of material, although if desired the side plate 15 may be provided with slots 24, one of which is shown in Fig. 7, and in this slot there may ride a pin 25, secured to the arm 26. This arm 26 is provided with a pivotal mounting 27 and a free end 28, which is formed for connection with a spring 29. The spring 29 may be connected to the side plate, as indicated at 30.

The pivotal mounting 27, may be of any usual type of construction, and it is preferred to have it so that the arc struck by the arm 26 will be the same as the arcuate slot 24.

Minor changes in the form, proportions, and details of construction may be resorted to without departing from the spirit of the invention of the scope of the appended claims.

Spring 39 may be connected to the side plate, as indicated at 30.

The pivotal mounting 27, may be of any usual type of construction, and it is preferred to have it so that the arc struck by the arm 26 will be the same as the arcuate slot 24.

As shown in Fig. 3, the slit or slot 19 may be provided at its outer end with an idler, which may be the roller 31. This roller will then act as a guide for the film 21.

What is claimed as new is:—

1. In a device of the class described, a casing and reel, one wall of said casing being cut along a radial line, and the adjacent wall portion being deflected outwardly to form an inclined guiding member for deflecting the film toward the reel.

2. In a device of the class described, a casing and reel, one wall of said casing being cut along a radial line and a portion of the wall being deflected adjacent the line of the cut, and a rotatable member engaging the film as it enters the deflected portion of the casing.

In testimony whereof I affix my signature.

HEZEKIAH CARPENTER.